United States Patent
Wang et al.

(10) Patent No.: US 12,058,654 B2
(45) Date of Patent: Aug. 6, 2024

(54) RESOURCE CONFIGURATION METHOD AND APPARATUS

(71) Applicant: HUAWEI TECHNOLOGIES CO., LTD., Shenzhen (CN)

(72) Inventors: Hong Wang, Beijing (CN); Baokun Shan, Shenzhen (CN); Jian Zhang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 520 days.

(21) Appl. No.: 17/246,083

(22) Filed: Apr. 30, 2021

(65) Prior Publication Data

US 2021/0258954 A1    Aug. 19, 2021

Related U.S. Application Data

(63) Continuation of application No. PCT/CN2018/113826, filed on Nov. 2, 2018.

(51) Int. Cl.
*H04W 72/51* (2023.01)
*H04W 52/02* (2009.01)
*H04W 72/0446* (2023.01)

(52) U.S. Cl.
CPC ... *H04W 72/0446* (2013.01); *H04W 52/0216* (2013.01); *H04W 52/0229* (2013.01); *H04W 72/51* (2023.01)

(58) Field of Classification Search
CPC ......... H04W 72/0446; H04W 52/0216; H04W 52/0229; H04W 72/51; H04W 72/23;
(Continued)

(56) References Cited

U.S. PATENT DOCUMENTS 10,542,491 B2 * 1/2020 Bhattad ............... H04W 76/28
11,051,362 B2 * 6/2021 Wang ................... H04W 80/02
(Continued)

FOREIGN PATENT DOCUMENTS

CN 102595646 A 7/2012
CN 105704769 A 6/2016
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.3.0, pp. 1-358, 3rd Generation Partnership Project, Valbonne, France (Sep. 2018).
(Continued)

*Primary Examiner* — Julio R Perez
(74) *Attorney, Agent, or Firm* — Leydig, Voit & Mayer, Ltd.

(57) ABSTRACT

A resource configuration method and an apparatus are applied to the field of communications technologies. The method includes: a user equipment (UE) receives a first message sent by a base station. The first message carries configuration information of a preconfigured resource, and the preconfigured resource is used for data transmission by the UE in an idle state. The UE obtains first indication information, and releases the preconfigured resource based on the first indication information.

12 Claims, 8 Drawing Sheets

(58) Field of Classification Search
CPC ..... H04W 72/52; H04W 76/27; H04W 76/30; Y02D 30/70

See application file for complete search history.

(56) References Cited

U.S. PATENT DOCUMENTS

| | | | |
|---|---|---|---|
| 11,356,141 B2* | 6/2022 | Rico Alvarino | H04L 1/08 |
| 11,690,086 B2* | 6/2023 | Phuyal | H04W 76/36 370/329 |
| 2013/0083807 A1* | 4/2013 | Ma | H04L 47/76 370/468 |
| 2016/0198441 A1* | 7/2016 | Xia | H04W 4/02 370/329 |
| 2018/0103415 A1 | 4/2018 | Jia et al. | |
| 2018/0279407 A1* | 9/2018 | Xu | H04W 12/08 |
| 2019/0200296 A1* | 6/2019 | Liu | H04W 52/0229 |
| 2019/0289660 A1* | 9/2019 | Yi | H04W 74/006 |
| 2020/0053649 A1* | 2/2020 | Yao | H04W 52/0235 |
| 2020/0100321 A1* | 3/2020 | Sengupta | H04J 13/0062 |
| 2020/0107396 A1* | 4/2020 | Wang | H04W 72/23 |
| 2021/0168894 A1* | 6/2021 | Sha | H04W 76/27 |
| 2021/0168895 A1* | 6/2021 | Sha | H04W 52/0235 |
| 2021/0298108 A1* | 9/2021 | Wu | H04W 56/0045 |
| 2022/0007392 A1* | 1/2022 | Chang | H04W 72/23 |

FOREIGN PATENT DOCUMENTS

| | | | | |
|---|---|---|---|---|
| CN | 106211332 A | 12/2016 | | |
| EP | 2827662 A1 | 1/2015 | | |
| WO | 2013135038 A1 | 9/2013 | | |
| WO | WO-2020029175 A1 * | 2/2020 | ........ | H04W 52/0235 |
| WO | WO-2020073167 A1 * | 4/2020 | | |

OTHER PUBLICATIONS

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.3.0, pp. 1-247, 3rd Generation Partnership Project, Valbonne, France (Sep. 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.3.0, pp. 1-546, 3rd Generation Partnership Project, Valbonne, France (Sep. 2018).

"3rd Generation Partnership Project; Technical Specification Group Core Network and Terminals; Non-Access-Stratum (NAS) protocol for Evolved Packet System (EPS); Stage 3 (Release 15)," 3GPP TS 24.301 V15.4.0, pp. 1-530, 3rd Generation Partnership Project, Valbonne, France (Sep. 2018).

"3rd Generation Partnership Project; Technical Specification Group Core Network and Terminals; Non-Access-Stratum (NAS) protocol for 5G System (5GS); Stage 3 (Release 15)," 3GPP TS 24.501 V15.1.0, pp. 1-398, 3rd Generation Partnership Project, Valbonne, France (Sep. 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, pp. 1-918, 3rd Generation Partnership Project, Valbonne, France (Sep. 2018).

Qualcomm Incorporated, "Supporting UL data transmission on pre-configured resources in IDLE," 3GPP TSG-RAN WG2 Meeting #103bis, Chengdu, China, R2-1814278, XP051523730, total 5 pages, 3rd Generation Partnership Project, Valbonne, France (Oct. 8-12, 2018).

LG Electronics, "Discussion on preconfigured UL resources in NB IoT," 3GPP VTSG RAN WG1 Meeting #94bis, Chengdu, China, R1-1810241, XP051517656, total 7 pages, 3rd Generation Partnership Project, Valbonne, France (Oct. 8-12, 2018).

LG Electronics, "Discussion on preconfigured UL resources in MTC," 3GPP TSG RAN WG1 Meeting #94 bis, Chengdu, China, R1-1810232, XP051517647, total 7 pages, 3rd Generation Partnership Project, Valbonne, France (Oct. 8-12, 2018).

* cited by examiner

RESOURCE CONFIGURATION METHOD AND APPARATUS

CROSS-REFERENCE TO RELATED APPLICATIONS

This application is a continuation of International Application No. PCT/CN2018/113826, filed on Nov. 2, 2018, the disclosure of which is hereby incorporated by reference in its entirety.

TECHNICAL FIELD

This application relates to the field of communications technologies, and in particular, to a resource configuration method and an apparatus.

BACKGROUND

Long term evolution machine type communication (LTE MTC) is a technology different from conventional LTE communication. In objectives of the LTE MTC, relatively long terminal apparatus standby time and relatively low terminal apparatus costs prioritize a data transmission rate, multi-band transmission, multi-antenna transmission, and full-duplex transmission. That is, terminals are expected to have low power consumption and low costs.

When a terminal (or user equipment (UE)) does not need to transmit uplink data or downlink data, the UE is in a radio resource control (RRC) idle state (RRC Idle). When the terminal needs to transmit uplink data or downlink data, the UE is in an RRC connected state (RRC Connected). A random access process (Random access) needs to be performed when the UE changes from the RRC idle state to the RRC connected state. The process includes four steps:

Step 1: The UE sends a random access preamble to a base station.

Step 2: The base station sends a random access response (RAR) message to the UE. The message carries an uplink timing advance (TA) and an uplink resource grant (UL Grant).

Step 3: The UE sends a message 3 (Msg3) to the base station. The message 3 may be an RRC connection request message, an RRC connection resume request message, an RRC early data request message, or an RRC connection reestablishment request message.

Step 4: The base station sends a contention resolution message, namely, a message 4 (Msg4), to the UE. The message 4 may further include an RRC connection setup message, RRC connection resume message, RRC early data complete message, RRC connection reestablishment message, or RRC connection release message that corresponds to the message 3.

Before an early data transmission (EDT) technology is introduced, the UE establishes/resumes an RRC connection to the base station by performing an RRC connection setup or RRC connection resume procedure, and then starts to transmit uplink and downlink data after the Msg4. In the EDT technology, uplink data may be transmitted in the Msg3, and downlink data may be transmitted in the Msg4. When the UE needs to transmit only a small amount of data, data transmission efficiency may be improved, and an RRC connection does not need to be established/resumed. Further, for terminals using MTC and terminals using narrow band internet of things (NB-IoT), especially for some low-mobility or static terminals (for example, a water meter, an electricity meter, and a street lamp), data transmission of the terminals has periodicity, and the terminals move slowly or are completely static. Therefore, a method for sending uplink data on a preconfigured resource is proposed. The preconfigured resource is used for data transmission by the UE in an idle state. In this method, step 1 and step 2 in the random access process do not need to be performed, and step 3 and step 4 may be directly performed. That is, uplink data and downlink data are directly transmitted. After the preconfigured resource is allocated to the UE, if the UE cannot properly release the resource, the preconfigured resource is wasted.

SUMMARY

This application provides a resource configuration method and an apparatus. The method and apparatus provided in this application resolve a problem in the current technology that a preconfigured resource is wasted if the UE cannot properly release the preconfigured resource after the preconfigured resource is allocated to the UE.

According to a first aspect, a resource configuration method is provided. The method includes:

receiving, by user equipment (UE), a first message sent by a base station, where the first message carries configuration information of a preconfigured resource, and the preconfigured resource is used for data transmission by the UE in an idle state; and obtaining, by the UE, first indication information, and determining, based on the first indication information, to release the preconfigured resource.

In this embodiment, after the preconfigured resource is allocated according to the configuration information, the UE may determine, based on the first indication information, that the preconfigured resource is not effectively used and needs to be released, so that the preconfigured resource can be recycled and reused.

Optionally, there may be at least two cases of determining whether to release the preconfigured resource. In one case, the UE determines, based on usage of the preconfigured resource, whether the preconfigured resource is valid, and if the preconfigured resource is invalid, releases the preconfigured resource. In the other case, if the base station is overloaded, the base station may directly send the first indication information to the UE, and indicate the UE to release the preconfigured resource, to mitigate the overload of the base station.

Optionally, the determining, based on the first indication information, to release the preconfigured resource includes:
 determining, based on the first indication information, whether the preconfigured resource is valid; and
 if the preconfigured resource is invalid, releasing the preconfigured resource.

In this embodiment, a preconfigured resource that is not used by the UE for a long period of time after being allocated to the UE or a preconfigured resource that is occupied by the UE for a period longer than average duration is determined as an invalid preconfigured resource, and the invalid preconfigured resource may further be released, so that the invalid preconfigured resource of the UE is released in a timely and effective manner, and the base station properly reallocates the preconfigured resource.

Optionally, the first indication information is included in the configuration information.

Optionally, the first indication information is used to indicate a validity period of the preconfigured resource or indicate a quantity of times that the preconfigured resource can be used.

Usage of the preconfigured resource after the preconfigured resource is allocated to the UE may be determined based on a usage period of the preconfigured resource and a quantity of times that the preconfigured resource has been used. Therefore, in this embodiment, the validity period of the preconfigured resource and the quantity of times that the preconfigured resource can be used may be set to properly determine whether the preconfigured resource is properly and effectively used after the preconfigured resource is allocated to the UE. If the preconfigured resource is not properly and effectively used, the preconfigured resource is released, so that the base station can properly reallocate the preconfigured resource, thereby improving resource utilization. In addition, the period or quantity of times is indicated based on the first indication information, a specific implementation may be as follows:

Optionally, when the first indication information indicates the validity period of the preconfigured resource, the determining, based on the first indication information, whether the preconfigured resource is valid includes:
- determining whether a moment corresponding to a current preconfigured resource is within a validity period; and if the moment is within the validity period, determining that the preconfigured resource is valid; or if the moment is not within the validity period, determining that the preconfigured resource is invalid, where a start moment of the validity period is a preset first moment, and duration of the validity period is a duration value corresponding to the validity period; or
- determining a time difference between a moment corresponding to a current preconfigured resource and a moment corresponding to a preconfigured resource previously used by the UE, determining whether the time difference is less than duration corresponding to information about the validity period; and if the time difference is less than the duration, determining that the preconfigured resource is valid; or if the time difference is not less than the duration, determining that the preconfigured resource is invalid.

In this embodiment, the UE determines, based on time information, whether the preconfigured resource is properly and effectively used, and releases the preconfigured resource if the preconfigured resource is not properly and effectively used. Therefore, the preconfigured resource can be ensured to be released in a timely manner after the preconfigured resource is allocated to the UE, avoiding a waste of the resource. In addition, when the preconfigured resource is frequently used or the preconfigured resource is still used by the UE, in this embodiment, the validity period of the preconfigured resource may be prolonged. In this instance, on a premise that the preconfigured resource is ensured to be evenly and properly used, it can also be ensured that continuous use of the preconfigured resource by the UE is not interrupted due to a fixed validity period, thereby improving rationality of a solution of releasing an invalid preconfigured resource.

Optionally, when the first indication information indicates the validity period of the preconfigured resource, the determining, based on the first indication information, whether the preconfigured resource is valid includes:
- starting a timer at a preset second moment, where duration of the timer is a duration value corresponding to the validity period; and when determining whether the preconfigured resource is valid, determining that the preconfigured resource is valid if the timer is running, or determining that the preconfigured resource is invalid if the timer expires or stops running.

Optionally, after it is determined that the preconfigured resource is valid, the method further includes:
- if the UE uses the preconfigured resource, resetting the timer.

In this embodiment, the validity period of the preconfigured resource is determined by using the timer. This operation is convenient and easy to implement, thereby improving operability of the method. In addition, for a preconfigured resource that may be continuously used, a validity period of the preconfigured resource may be prolonged by simply restarting a timer. This operation is convenient and easy to implement.

Optionally, when the first indication information indicates the quantity of times that the preconfigured resource can be used, the determining, based on the first indication information, whether the preconfigured resource is valid includes:
- after the preconfigured resource takes effect, starting counting when the first preconfigured resource appears for the first time; determining whether a quantity of times that the preconfigured resource appears is within the quantity of times that the preconfigured resource can be used; and if the quantity of times that the preconfigured resource appears is within the quantity of times that the preconfigured resource can be used, determining that the preconfigured resource is valid; or if the quantity of times that the preconfigured resource appears is not within the quantity of times that the preconfigured resource can be used, determining that the preconfigured resource is invalid; or
- starting counting when the UE uses the preconfigured resource; determining whether a quantity of times that the preconfigured resource appears is within the quantity of times that the preconfigured resource can be used; and if the quantity of times that the preconfigured resource appears is within the quantity of times that the preconfigured resource can be used, determining that the preconfigured resource is valid; or if the quantity of times that the preconfigured resource appears is not within the quantity of times that the preconfigured resource can be used, determining that the preconfigured resource is invalid.

In this embodiment, whether the preconfigured resource is valid is determined based on the quantity of times that the preconfigured resource can be used, to avoid impact of a periodicity of the preconfigured resource on a quantity of preconfigured resources allocated to the UE, so that a preconfigured resource that can be used by the UE can be more properly determined.

Optionally, when the base station is overloaded, in this embodiment, the base station may directly send the first indication information to the UE, and then the UE releases a corresponding preconfigured resource based on the first indication information. In this case, the obtaining, by the UE, first indication information, and determining, based on the first indication information, to release the preconfigured resource includes:
- receiving, by the UE, a physical downlink control channel (PDCCH) scrambled by using a paging radio network temporary identifier (P-RNTI); and
- if a paging message scheduled by the PDCCH carries the first indication information, or a direct indication carried by the PDCCH includes the first indication information, releasing the preconfigured resource, where the first indication information is used to indicate to release the preconfigured resource.

Optionally, the obtaining, by the UE, first indication information, and determining, based on the first indication information, to release the preconfigured resource includes:

receiving, by the UE, a wake-up signal (WUS); and if a signal sequence of the WUS is the same as a preset signal sequence, and the WUS carries the first indication information, releasing the preconfigured resource.

In this embodiment, when an evolved NodeB (eNB) is overloaded, the eNB may directly indicate, by using the direct indication or the paging message, the UE to release the preconfigured resource, thereby quickly and effectively reducing the load of the eNB.

According to a second aspect, a resource configuration method is provided. The method includes:

receiving, by user equipment (UE), a first message from a source network-side device, where the first message carries configuration information of a preconfigured resource, and the preconfigured resource is used for data transmission by the UE in an idle state; and when the UE determines that a serving cell changes or when the UE performs cell reselection, releasing, by the UE, the preconfigured resource.

Optionally, before the releasing, by the UE, the preconfigured resource, the method further includes:

sending, by the UE, a second message to a corresponding target network-side device after the serving cell changes or after the cell reselection, where the second message carries a first indication and an identifier, the first indication is used to indicate the preconfigured resource configured for the UE, and the identifier indicates an identifier of a corresponding source cell or of the source network-side device before the serving cell of the UE changes or before the cell reselection.

In this embodiment, when moving to another cell and accesses the cell, the UE notifies the target cell that the preconfigured resource is configured for the UE, so that the target cell indicates the source cell to release the preconfigured resource. In this way, it is ensured that the preconfigured resource can be released in time after the UE performs a cell change.

According to a third aspect, a resource configuration method is provided. The method includes:

sending, by a network-side device, first indication information to UE, where the first indication information is used to indicate the UE to release a preconfigured resource.

Optionally, the method may further include:

sending, by the network-side device, a first message to the UE, where the first message carries configuration information of the preconfigured resource, and the preconfigured resource is used for data transmission by the UE in an idle state.

Optionally, if the first indication information indicates that the preconfigured resource is invalid, the UE releases the preconfigured resource.

Optionally, the first indication information is included in the first message.

Optionally, the first indication information is used to indicate a validity period of the preconfigured resource or indicate a quantity of times that the preconfigured resource can be used.

Optionally, the sending, by a network-side device, first indication information to UE includes:

sending, by the network-side device to the UE, a PDCCH scrambled by using a P-RNTI, where the PDCCH or a paging message scheduled by the PDCCH carries the first indication information, or a direct indication carried by the PDCCH carries the first indication information.

Optionally, the sending, by a network-side device, first indication information to UE includes:

sending, by the network-side device, a wake-up signal (WUS) to the UE, where the WUS carries the first indication message.

According to a fourth aspect, a resource configuration method is provided. The method includes:

sending, by a source network-side device, a first message to user equipment (UE), where the first message carries configuration information of a preconfigured resource, and the preconfigured resource is used for data transmission by the UE in an idle state; and receiving, by the source network-side device, a second message from a target network-side device, where the second message carries a first indication and an identifier, the first indication is used to indicate that the preconfigured resource is preconfigured for the UE, and the identifier is an identifier of the UE.

In this embodiment, when a network side is overloaded, if a preconfigured resource cannot be released in time, a problem such as network disconnection is caused. Therefore, when a base station is overloaded, the base station may directly send the first indication information, and indicate the UE to release the preconfigured resource, to resolve a waste of the preconfigured resource and the network disconnection.

According to a fifth aspect, a terminal device is provided. The terminal device includes:

a processor; and a memory, storing instructions, and connected to the processor, where when the instructions are loaded and executed by the processor, the following steps are performed:

receiving a first message sent by a base station, where the first message carries configuration information of a preconfigured resource, and the preconfigured resource is used for data transmission by the UE in an idle state; and obtaining first indication information, and determining, based on the first indication information, to release the preconfigured resource.

Optionally, the processor is further configured to: determine, based on the first indication information, whether the preconfigured resource is valid; and if the preconfigured resource is invalid, release the preconfigured resource.

When the first indication information indicates validity of the preconfigured resource, the first indication information may be used to indicate a validity period of the preconfigured resource or indicate a quantity of times that the preconfigured resource can be used.

Optionally, when the first indication information indicates the validity period of the preconfigured resource, the processor is specifically configured to: determine whether a moment corresponding to a current preconfigured resource is within a validity period; and if the moment is within the validity period, determine that the preconfigured resource is valid; or if the moment is not within the validity period, determine that the preconfigured resource is invalid, where a start moment of the validity period is a preset first moment, and duration of the validity period is a duration value corresponding to the validity period; or determine a time difference between a moment corresponding to a current preconfigured resource and a moment corresponding to a preconfigured resource previously used by the UE; determine whether the time difference is less than duration corresponding to information about the validity period; and if the time difference is less than the duration, determine that the preconfigured resource is valid; or if the time difference is not less than the duration, determine that the preconfigured resource is invalid.

Optionally, when the first indication information indicates the validity period of the preconfigured resource, the processor is specifically configured to: start a timer at a preset second moment, where duration of the timer is a duration value corresponding to the validity period; and when determining whether the preconfigured resource is valid, determine that the preconfigured resource is valid if the timer is running, or determine that the preconfigured resource is invalid if the timer expires or stops running.

Optionally, when determining that the preconfigured resource is valid, the processor is further configured to reset the timer if the UE uses the preconfigured resource.

In this embodiment, the timer may be adjusted based on the following mechanism, to prolong the validity period of the preconfigured resource, thereby achieving an effect of prolonging the validity period.

Optionally, when the first indication information indicates the quantity of times that the preconfigured resource can be used, the processor is further configured to: after the preconfigured resource takes effect, start counting when the first preconfigured resource appears for the first time; determine whether a quantity of times that the preconfigured resource appears is within the quantity of times that the preconfigured resource can be used; and if the quantity of times that the preconfigured resource appears is within the quantity of times that the preconfigured resource can be used, determine that the preconfigured resource is valid; or if the quantity of times that the preconfigured resource appears is not within the quantity of times that the preconfigured resource can be used, determine that the preconfigured resource is invalid; or start counting when the UE uses the preconfigured resource; determine whether a quantity of times that the preconfigured resource appears is within the quantity of times that the preconfigured resource can be used; and if the quantity of times that the preconfigured resource appears is within the quantity of times that the preconfigured resource can be used, determine that the preconfigured resource is valid; or if the quantity of times that the preconfigured resource appears is not within the quantity of times that the preconfigured resource can be used, determine that the preconfigured resource is invalid.

The processor is further configured to: receive a PDCCH scrambled by using a P-RNTI; and if a paging message scheduled by the PDCCH carries the first indication information, or a direct indication carried by the PDCCH includes the first indication information, release the preconfigured resource, where the first indication information is used to indicate to release the preconfigured resource.

The processor is further configured to: receive a wake-up signal (WUS); and if a signal sequence of the WUS is the same as a preset signal sequence, and the WUS carries the first indication information, release the preconfigured resource.

According to a sixth aspect, a terminal device is provided. The terminal device includes:
 a processor; and
 a memory, storing instructions, and connected to the processor, where when the instructions are loaded and executed by the processor, the following steps are performed:
 receiving a first message from a source network-side device, where the first message carries configuration information of a preconfigured resource, and the preconfigured resource is used for data transmission by the UE in an idle state; and
 when the terminal device determines that a serving cell changes or when the terminal device performs cell reselection, releasing the preconfigured resource.

Optionally, before the UE releases the preconfigured resource, the processor is further configured to send a second message to a corresponding target network-side device after a serving cell changes or after cell reselection, where the second message carries a first indication and an identifier, the first indication is used to indicate the preconfigured resource configured for the UE, and the identifier indicates an identifier of a corresponding source cell or of the source network-side device before the serving cell of the UE changes or before the cell reselection.

According to a seventh aspect, a network-side device is provided. The network-side device includes:
 a processor; and
 a memory, storing instructions, and connected to the processor, where when the instructions are loaded and executed by the processor, the following steps are performed:
 sending first indication information to UE, where the first indication information is used to indicate the UE to release a preconfigured resource.

Optionally, the processor is further configured to send first indication information to the UE, where the first indication information is used to indicate the UE to release the preconfigured resource.

Optionally, to allocate a preconfigured resource to the UE, in this embodiment, the processor is further configured to send the first message to the UE, where the first message carries the configuration information of the preconfigured resource.

The first indication information may be included in a first message. In addition, if the first indication information indicates that the preconfigured resource is invalid, the UE releases the preconfigured resource. Further, an implementation for determining whether the preconfigured resource is valid is further specifically indicated. To be specific, whether the preconfigured resource is still valid for the UE may be determined based on duration in which the preconfigured resource is occupied by the UE and a quantity of times that the preconfigured resource appears after the preconfigured resource is allocated to the UE. Corresponding to this case, the first indication information may be used to indicate a validity period of the preconfigured resource or indicate a quantity of times that the preconfigured resource can be used.

Optionally, the processor is further configured to send, to the UE, a PDCCH scrambled by using a P-RNTI, where the PDCCH or a paging message scheduled by the PDCCH carries the first indication information, or a direct indication carried by the PDCCH carries the first indication information.

Optionally, the processor is further configured to send a wake-up signal (WUS) to the UE, where the WUS carries the first indication message.

According to an eighth aspect, a network-side device is provided. When a cell of UE changes, the network-side device corresponds to a source cell of the UE after the cell changes. The network-side device includes:

a processor; and a memory, storing instructions, and connected to the processor, where when the instructions are loaded and executed by the processor, the following steps are performed:

sending a first message to user equipment (UE), where the first message carries configuration information of a preconfigured resource, and the preconfigured resource is used for data transmission by the UE in an idle state; and receiving a second message from a target network-side device, where the second message carries a first indication and an identifier, the first indication is used to indicate that the preconfigured resource is preconfigured for the UE, and the identifier is an identifier of the UE.

According to a ninth aspect, a computer storage medium is provided. The computer storage medium includes instructions. When the instructions are run on a computer, the computer is enabled to perform the method according to any one of the first aspect to the fourth aspect.

According to a tenth aspect, a computer program product is provided. The computer program product includes instructions. When the instructions are run on a computer, the computer is enabled to perform the method according to any one of the first aspect to the fourth aspect.

According to the method and the apparatus provided in embodiments of this application, use of the preconfigured resource configured by the base station for the UE is controlled, so that the UE can release the preconfigured resource when a specific condition is satisfied, thereby avoiding a waste of the preconfigured resource that is caused because the preconfigured resource is not used for a long period of time.

DESCRIPTION OF EMBODIMENTS

Figure 1:
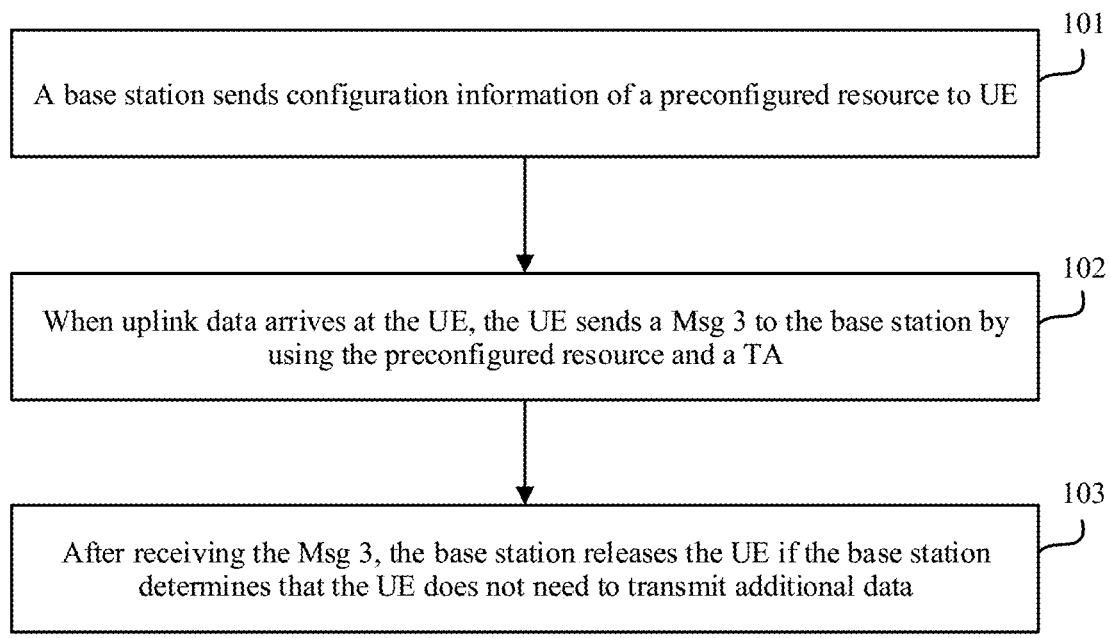
FIG. 1 is a flowchart of a method for sending uplink data by using a preconfigured resource in the current technology.

Because a method for sending uplink data on a preconfigured resource may be used to directly transmit uplink and downlink data without determining a random access preamble, the method for sending uplink data on a preconfigured resource is applied to many aspects. A procedure of the method for sending uplink data on a preconfigured resource specifically includes the following steps (as shown in FIG. 1):

Step 101: A base station (or a serving cell) sends configuration information of a preconfigured resource to UE. The preconfigured resource is used for data transmission by the UE in an idle state.

Optionally, the configuration information may be sent by using an RRC connection release message, an RRC connection reconfiguration message, or an RRC early data complete message.

Optionally, after the base station sends the configuration information to the UE, the UE enters the idle state, and stores the configuration information of the preconfigured resource and a TA associated with the preconfigured resource.

Step 102: When uplink data arrives at the UE, the UE sends a Msg3 to the base station by using the preconfigured resource and the TA. The Msg3 carries the uplink data.

Step 103: After receiving the Msg3, if the base station determines, based on indication information that is carried in the Msg3 and used to indicate that the UE does not need to transmit additional data, that the UE does not need to transmit additional data, the base station switches the UE to the idle state.

However, for an NB-IoT terminal or some low-mobility or static terminals, because data transmission of these terminals is periodic, and the terminals also move slowly or are completely static. A data transmission periodicity of UE may change. In this case, a preconfigured resource cannot be used. Consequently, after a large quantity of preconfigured resources are allocated to the UE, the preconfigured resources cannot be effectively used or cannot be released in time, causing a waste of resources.

Figure 2:
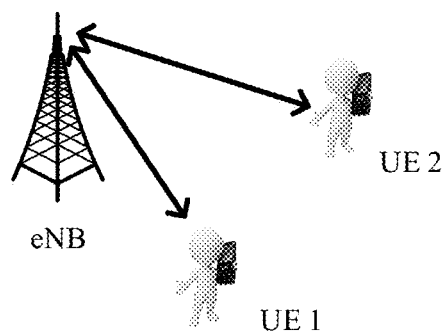
FIG. 2 is a framework diagram of a communications system to which a method according to an embodiment of this application is applicable.

To resolve the foregoing problem in the current technology, this application provides a resource configuration method. The method may be applied to LTE or a future communications system such as 5G. A specific applicable scenario includes a scenario in which user equipments (UE) interact with an evolved NodeB (Evolved Node B, eNB) shown in FIG. 2. The eNB may alternatively be a gNB in 5G.

The user equipments include mobile phones, smart terminals, multimedia devices, streaming media devices, and the like.

The eNB is a bridge between UE in LTE (4G) and an evolved packet core (EPC) core network. The eNB is connected through an X2 interface. Main functions of the eNB include: radio resource management, IP header compression, user data stream encryption, MME selection during UE attachment, routing of user-plane data to an S-GW, organization and transmission of a paging message, organization and transmission of a broadcast message, measurement for mobility or scheduling purposes, measurement report configuration, and the like.

To describe a specific implementation process of the solution provided in this application more clearly and in detail, with reference to specific examples, the following further describes in detail the method provided in embodiments of this application.

Figure 3:
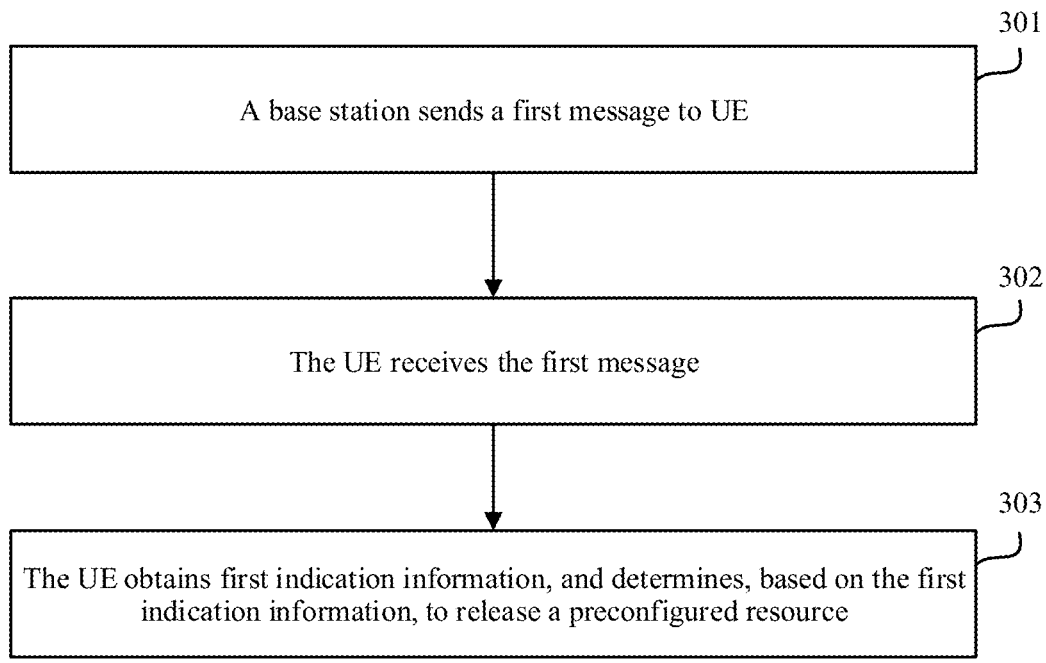
FIG. 3 is a schematic flowchart of a resource configuration method according to an embodiment of this application.

FIG. 3 shows a resource configuration method according to an embodiment of this application. The method may specifically include the following implementation steps.

Step 301: A base station (which may be an eNB or referred to as a network-side device) sends a first message to UE. The first message carries configuration information of a preconfigured resource (or referred to as pre-configuration information of an uplink resource).

In this embodiment of this application, the first message may be an RRC connection reconfiguration message, an RRC connection release message, or an RRC early data complete message. The foregoing three types are specific examples. Certainly, in a specific use environment, the first message may alternatively be another message.

Step 302: The UE receives the first message.

Step 303: The UE obtains first indication information, and determines, based on the first indication information, to release the preconfigured resource.

In this embodiment of this application, there may be two manners of determining, based on the first indication information, to release the preconfigured resource. In one manner, whether the preconfigured resource is valid is determined based on the first indication information; and if the preconfigured resource is invalid, the preconfigured resource is released; or if the preconfigured resource is valid, the preconfigured resource is used to send uplink data. In the other manner, the first indication information directly indicates the UE to release the preconfigured resources. The method provided in this embodiment of this application is further described in detail below with reference to two manners of releasing the preconfigured resource.

Figure 4:
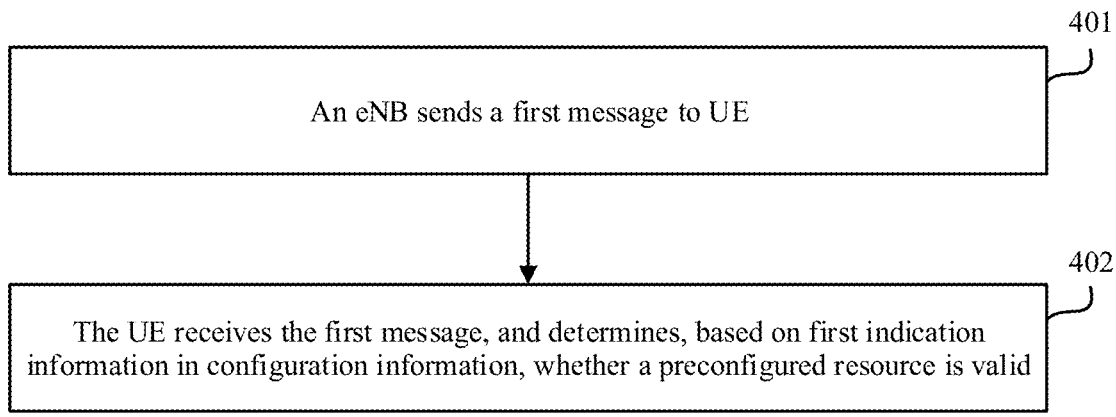
FIG. 4 is a schematic flowchart of another resource configuration method according to an embodiment of this application.

In a first manner of releasing the preconfigured resource, whether the preconfigured resource is valid is determined based on the first indication information; and if the preconfigured resource is invalid, the preconfigured resource is released; or if the preconfigured resource is valid, the preconfigured resource is used to send uplink data. In this case, a resource configuration method provided in an embodiment of this application may specifically include the following steps (as shown in FIG. 4):

Step 401: An eNB sends a first message to UE. The first message carries configuration information of a preconfigured resource (or referred to as pre-configuration information of an uplink resource).

In this embodiment of this application, the configuration information may include first indication information indicating whether the preconfigured resource is valid. Specifically, the first indication information may be used to indicate a validity period of the preconfigured resource or indicate a quantity of times that the preconfigured resource can be used.

1. When the first indication information indicates the validity period of the preconfigured resource, the UE may use the periodically appeared preconfigured resource for a plurality of times within the validity period, and release the preconfigured resource after the validity period expires. In another possible implementation, after the UE uses a preconfigured resource, a location of the used resource is used as a start moment. This is equivalent to prolonging a period used for determining that the preconfigured resource is valid by duration of the validity period. The preconfigured resource is valid within the validity period. After the validity period expires, the preconfigured resource is released.

2. When the first indication information indicates the quantity of times that the preconfigured resource can be used, the first indication information may indicate to start counting when the preconfigured resource takes effect. If a quantity of times that the UE uses the preconfigured resource is less than or equal to the quantity of times that the preconfigured resource can be used, the preconfigured resource is valid. If the quantity of times that the UE uses the preconfigured resource is greater than the quantity of times that the preconfigured resource can be used, the preconfigured resource is released. In another possible implementation, counting starts when the UE uses the preconfigured resource; whether a quantity of times that the preconfigured resource appears is less than or equal to the quantity of times that the preconfigured resource can be used is determined; and if the quantity of times that the preconfigured resource appears is less than or equal to the quantity of times that the preconfigured resource can be used, it is determined that the preconfigured resource is valid; or if the quantity of times that the preconfigured resource appears is greater than the quantity of times that the preconfigured resource can be used, the preconfigured resource is released.

A method provided in this embodiment of this application provides for transferring an invalid preconfigured resource allocated to the UE to a reused state. Therefore, in the foregoing implementations, in addition to release of the invalid preconfigured resource, the preconfigured resource may also be processed in any one of the following manners:

disabling, deconfiguring, or deactivating the preconfigured resource.

Further, to enable the UE to determine a preconfigured resource configured by the base station, the configuration information in this embodiment of this application may further include any one or a combination of the following information (where, for example, the configuration information includes A1 to A3, and may be one of A1 to A3, or may be a combination of A1 and A2, a combination of A1 and A3, or a combination of A1, A2, and A3).

A1 is time domain information of a preconfigured resource: In a specific implementation of the time domain information, a preconfigured resource configured by the base station is determined by using a periodicity or a specific time point.

Specifically, the preconfigured resource is determined by using the periodicity (period). A unit of the periodicity may be a subframe, a system frame number (SFN), a hyper system frame number (hyper-SFN), a millisecond, a second, a minute, an hour, a day, or the like. In a first case, when only the periodicity is configured and no offset value is configured, a reference time point of the periodicity, namely, a start moment of the first periodicity, needs to be determined. A specific start moment may be a moment at which the first message is received or a moment at which an RRC connection is released. In a second case, both the periodicity and an offset value Offset are configured. For example, units of both the periodicity and the offset value are subframes. In this case, a resource satisfying an SFN and a subframe location in the following formula is a preconfigured resource: ((SFN×10)+subframe)mod period=Offset.

Alternatively, the preconfigured resource is determined based on a time point of the preconfigured resource. The time point may be specifically information about a specific moment, for example, 12:00:00.000 every day, which is accurate to milliseconds.

A2 is frequency domain information of the preconfigured resource, for example, a narrowband or a carrier of the preconfigured resource, and a quantity of PRBs of the preconfigured resource.

A3: The configuration message may further include downlink control information (DCI), which specifically indicates a specific physical resource block (PRB) location of the preconfigured resource.

The DCI is used to schedule an uplink resource. Herein, the base station may send the DCI to the UE in a connected state, and indicate that the DCI is used for uplink data transmission in an idle state, that is, used to indicate a preconfigured resource. Starting from receiving of the DCI, the preconfigured resource periodically appears. That is, the start moment of the foregoing periodicity may be a moment at which the DCI is received.

Step 402: The UE receives the first message; determines, based on the first indication information in the configuration information, whether the preconfigured resource is valid; and if the preconfigured resource is valid, uses the preconfigured resource to send uplink data; or if the preconfigured resource is invalid, releases the preconfigured resource.

The first indication information may indicate the validity period of the preconfigured resource or may indicate the quantity of times that the preconfigured resource can be used, and a manner in which the UE determines, based on the first indication information, whether the preconfigured resource is valid may be as follows:

1: When the first indication information indicates the validity period of the preconfigured resource, the determining, based on the first indication information, whether the preconfigured resource is valid includes the following manners.

Figure 5:
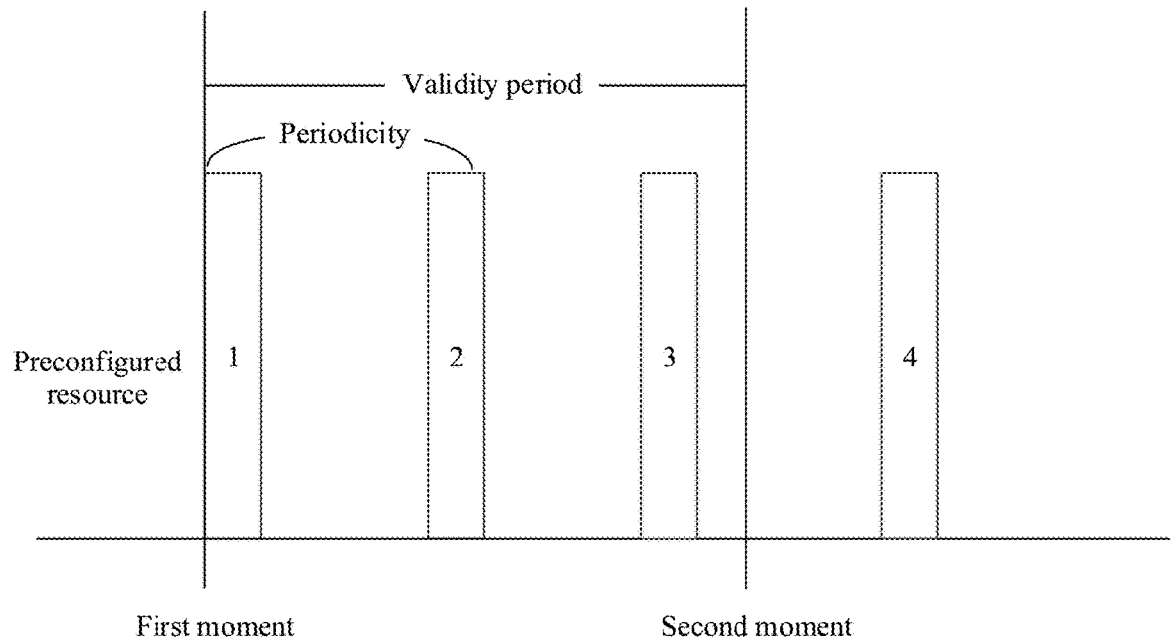
FIG. 5 is a schematic diagram of determining, by using a validity period, whether a preconfigured resource is valid according to an embodiment of this application.

Manner 1: Whether a moment corresponding to a current preconfigured resource is within a validity period is determined; and if the moment is within the validity period, it is determined that the preconfigured resource is valid; or if the moment is not within the validity period, it is determined that the preconfigured resource is invalid. A start moment of the validity period is a preset first moment, and duration of the validity period is a duration value corresponding to the validity period. As shown in FIG. 5, the first moment may be a start moment corresponding to a preconfigured resource periodicity, namely, a moment of a preconfigured resource 1. In FIG. 5, it may be determined, based on duration of the validity period, that the validity period is a time segment between the first moment and a second moment. In this case, if the current preconfigured resource corresponds to any preconfigured resource (for example, any one of preconfigured resources 1 to 3) in the validity period, the current preconfigured resource is valid; or if the current preconfigured resource does not correspond to any preconfigured resource in the validity period, the current preconfigured resource is invalid. That is, if the current preconfigured resource is the preconfigured resources 1 to 3 in FIG. 5, the preconfigured resource is valid; or if the current preconfigured resource is a preconfigured resource 4, the preconfigured resource is invalid.

Manner 2: After a preconfigured resource is used once, there is a high probability that the preconfigured resource is continuously used subsequently, and the preconfigured resource is continuously used for some services for a relatively long period of time. To adapt to this case, in this embodiment of this application, when validity of the preconfigured resource is determined, a start moment of the validity period of the preconfigured resource is further dynamically adjusted based on usage of the preconfigured resource, so that the validity period determined in the entire solution can more accurately adapt to use of the preconfigured resource by the UE. A specific implementation may include:

determining a time difference between a moment corresponding to a current preconfigured resource and a moment corresponding to a preconfigured resource previously used by the UE; determining whether the time difference is less than duration corresponding to information about the validity period; and if the time difference is less than the duration, determining that the preconfigured resource is valid; or if the time difference is not less than the duration, determining that the preconfigured resource is invalid.

Figure 6:
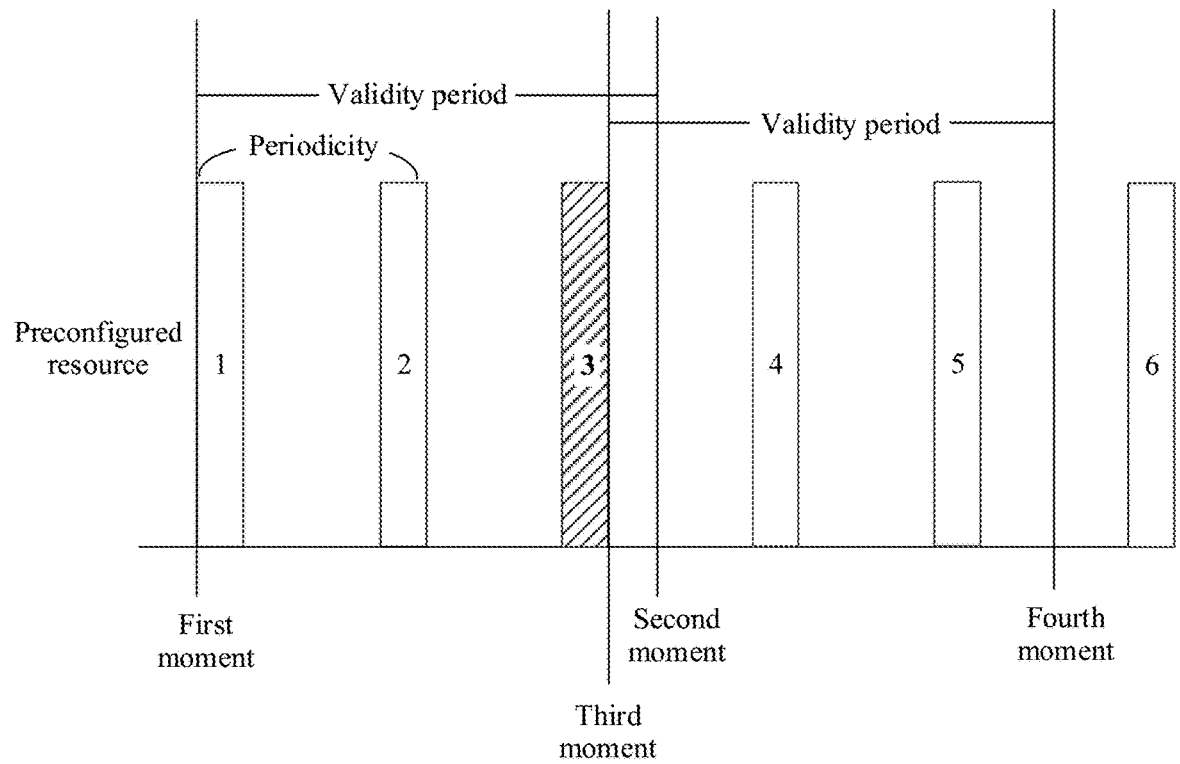
FIG. 6 is another schematic diagram of determining, by using a validity period, whether a preconfigured resource is valid according to an embodiment of this application.

As shown in FIG. 6, the UE uses a preconfigured resource 3, and the preconfigured resource 3 corresponds to a third moment. In this embodiment, a validity period is prolonged by duration corresponding to the validity period from the third moment. That is, a preconfigured resource 4 and a preconfigured resource 5 are valid preconfigured resources. If the preconfigured resources 4 and 5 are not used, a preconfigured resource 6 after the validity period is invalid. Alternatively, if the preconfigured resource 4 or 5 is used, a validity period of a corresponding preconfigured resource is prolonged again by duration corresponding to information about at least one validity period.

Manner 3: In addition, to conveniently determining information about the validity period, in this embodiment of this application, whether the preconfigured resource is valid may be determined by using a timer. A specific implementation may include:

starting a timer at a preset second moment, where duration of the timer is a duration value corresponding to the validity period; and when determining whether the preconfigured resource is valid, determining that the preconfigured resource is valid if the timer is running, or determining that the preconfigured resource is invalid if the timer expires or stops running.

Based on the manner 3, after it is determined that the preconfigured resource is valid, if the UE uses the preconfigured resource, the timer may further be restarted. After the timer is restarted, the duration of the timer is the duration value corresponding to the validity period. That is, the validity period of the preconfigured resource is prolonged by one validity period.

2: When the first indication information indicates the quantity of times that the preconfigured resource can be used, the determining, based on the first indication information, whether the preconfigured resource is valid includes:

after the preconfigured resource takes effect, starting counting when the first preconfigured resource appears for the first time; determining whether a quantity of times that the preconfigured resource appears is less than or equal to the quantity of times that the preconfigured resource can be used; if the quantity of times that the preconfigured resource appears is less than or equal to the quantity of times that the preconfigured resource can be used, determining that the preconfigured resource is valid; or if the quantity of times that the preconfigured resource appears is greater than the quantity of times that the preconfigured resource can be used, determining that the preconfigured resource is invalid.

Figure 7:
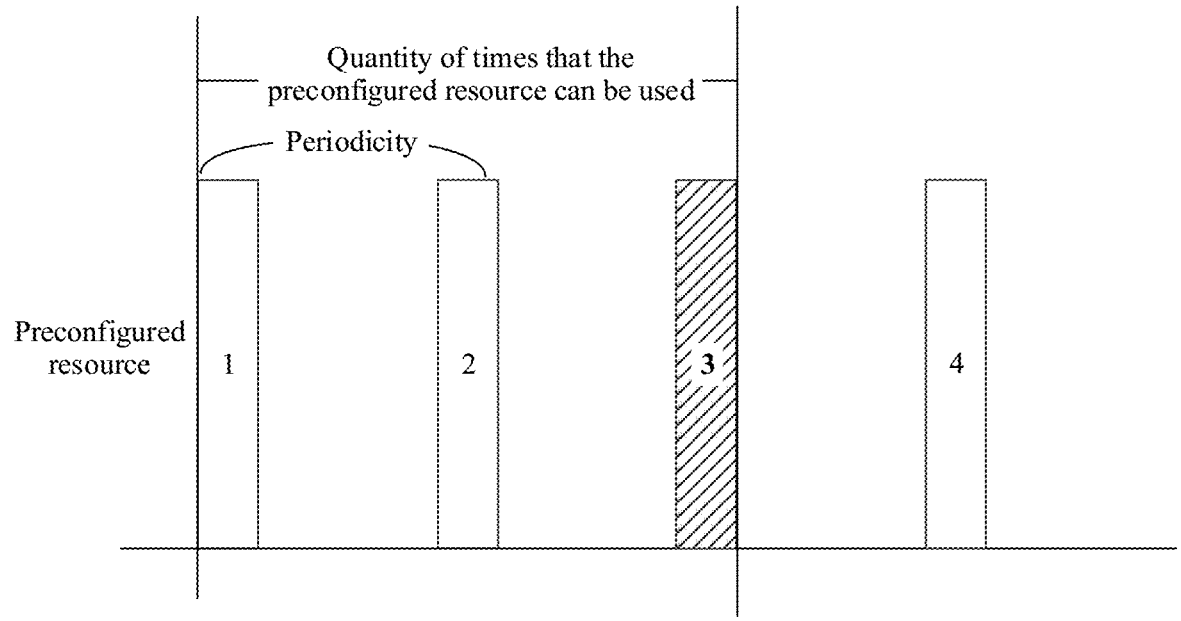
FIG. 7 is a schematic diagram of determining, by using a quantity of times that a preconfigured resource can be used, whether the preconfigured resource is valid according to an embodiment of this application.

As shown in FIG. 7, if the preconfigured resource can be used three times, the UE may use any resource of three preconfigured resources starting from the preconfigured resource 1. After the three preconfigured resources, the preconfigured resource is released.

Alternatively, counting starts when the UE uses the preconfigured resource; whether a quantity of times that the preconfigured resource appears is within the quantity of times that the preconfigured resource can be used is determined; and if the quantity of times that the preconfigured resource appears is within the quantity of times that the preconfigured resource can be used, it is determined that the preconfigured resource is valid; or if the quantity of times that the preconfigured resource appears is not within the quantity of times that the preconfigured resource can be used, it is determined that the preconfigured resource is invalid.

Figure 8:
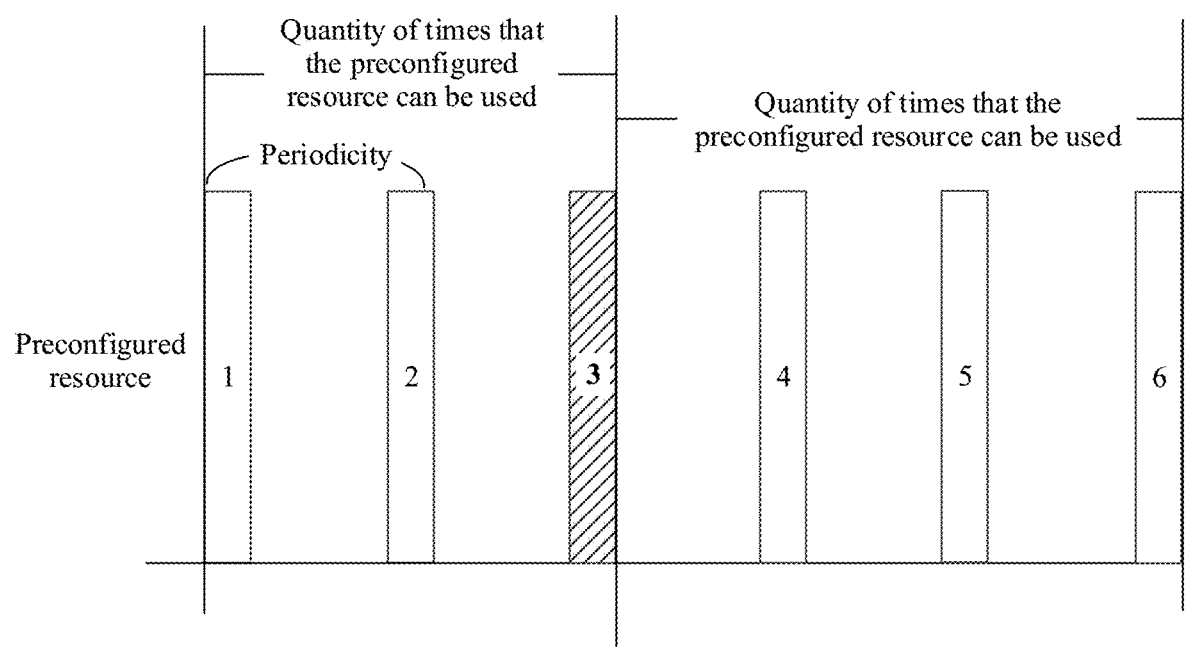
FIG. 8 is another schematic diagram of determining, by using a quantity of times that a preconfigured resource can be used, whether the preconfigured resource is valid according to an embodiment of this application.

As shown in FIG. 8, because the preconfigured resources 1 to 3 correspond to the quantity of times that the preconfigured resource can be used, the preconfigured resources 1 to 3 are valid. If the preconfigured resource 3 is used, when it is subsequently determined whether the preconfigured resource is valid, counting starts from the preconfigured resource 3.

Further, when allocating preconfigured resources to the UE, the base station may allocate a plurality of sets of preconfigured resources to the UE. Therefore, in the method provided in this embodiment of this application, the configuration information may carry one piece of first indication information. The plurality of sets of preconfigured resources share the first indication information to determine whether the preconfigured resources are valid. Certainly, the configuration information may alternatively carry a plurality of pieces of first indication information. Each set of preconfigured resources may correspond to one piece of first indication information, to determine, based on the first indication information corresponding to the set of preconfigured resources, whether the preconfigured resources are valid.

According to the method provided in the foregoing embodiment of this application, use of the preconfigured resource configured by the base station for the UE is controlled, so that the UE can release the preconfigured resource when a specific condition is satisfied, thereby avoiding a waste of the preconfigured resource that is caused because the preconfigured resource is not used for a long period of time.

Figure 9:
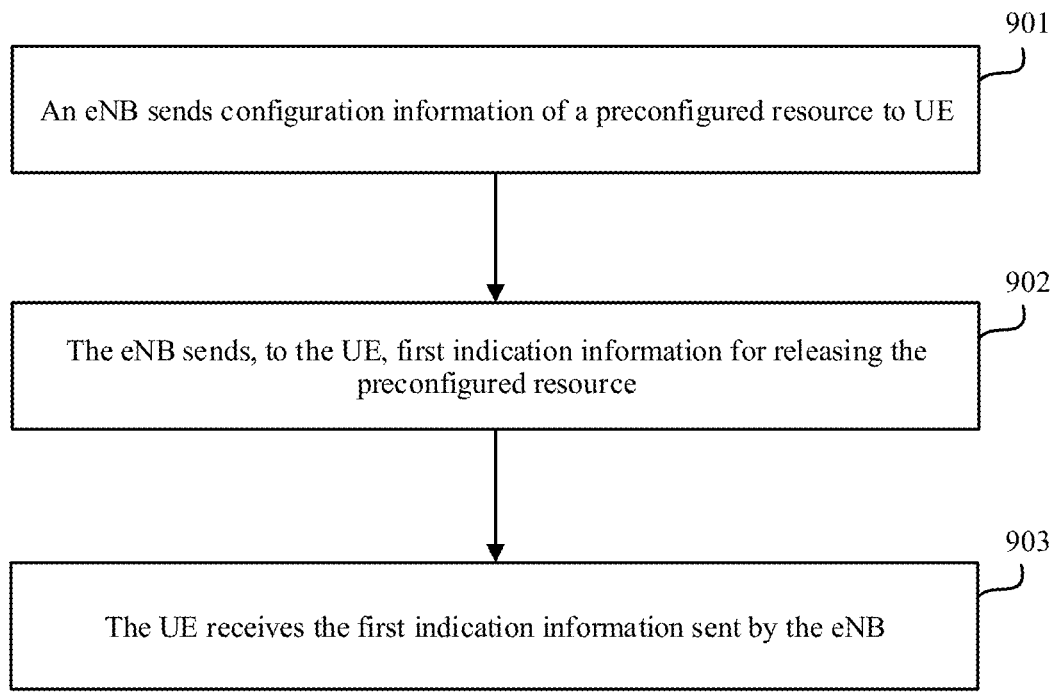
FIG. 9 is a schematic flowchart of another resource configuration method according to an embodiment of this application.

In a second manner of releasing the preconfigured resource, if the preconfigured resource cannot be properly used after being configured for the UE, the resource is wasted. When a network side is overloaded, if a preconfigured resource cannot be released in time, a problem such as network disconnection is caused. Therefore, in a method provided in an embodiment of this application, when a base station is overloaded, the base station may directly send first indication information, and indicate UE to release a preconfigured resource, to resolve a waste of the preconfigured resource and network disconnection. A specific implementation of this embodiment may include the following steps (as shown in FIG. 9).

Step 901: An eNB sends configuration information of a preconfigured resource to UE.

Step 902: The eNB sends, to the UE, first indication information for releasing the preconfigured resource.

The first indication information may also be referred to as a disabling indication, a deactivation indication, or a deconfiguration indication, and is used to notify the UE that the UE cannot use the preconfigured resource to send the uplink data anymore.

Specifically, the first indication information may be sent in the following manners:

1: The eNB sends, to the UE, a PDCCH scrambled by using a P-RNTI, where the PDCCH or a paging message scheduled by the PDCCH carries the first indication information, or a direct indication carried by the PDCCH carries the first indication information. 2: Alternatively, the eNB sends a wake-up signal (WUS) to the UE, where the WUS carries the first indication message.

The PDCCH may be an MPDCCH (MTC PDCCH) or an NPDCCH (Narrowband PDCCH).

With reference to specific examples, the following further describes an implementation in which the eNB includes the first indication information in the paging message or direct indication, including:

B1: When the first indication information is included in the direct indication or the paging message scheduled by using the PDCCH, a specific implementation may be:

The PDCCH scrambled by using the P-RNTI includes a DCI format 6-2 or a DCI format N2, and the DCI format 6-2 or the DCI format N2 may be used to send the paging message or the direct indication (direct indication). A bit flag in the DCI format 6-2 or the DCI format N2 is used to indicate whether the DCI format 6-2 or the DCI format N2 sends the paging message or the direct indication.

When flag=0, the DCI format 6-2 or the DCI format N2 is used to send the direct indication. Content of the direct indication sent by using the DCI format 6-2 is shown in a table 1, and includes eight bits in total. Bits 1 to 5 have been used, and any one of bits 6 to 8 may be used to carry the first indication information.

TABLE 1

| Direct indication information (direct indication information) | |
|---|---|
| Bit | direct indication information |
| 1 | systemInfoModification |
| 2 | etws-Indication |
| 3 | cmas-Indication |
| 4 | eab-ParamModification |
| 5 | systemInfoModification-eDRX |
| 6, 7, 8 | Unused |

Content of the direct indication sent by using the DCI format N2 is shown in a table 2, and includes eight bits in total. Bits 1 and 2 have been used, and any one of bits 3 to 8 may be used to carry the first indication information.

TABLE 2

Direct indication information (direct indication information)

| Bit | direct indication information |
|---|---|
| 1 | systemInfoModification |
| 2 | systemInfoModification-eDRX |
| 3, 4, 5, 6, 7, 8 | Unused |

When flag=1, the DCI format 6-2 or the DCI format N2 is used to schedule the paging message. The first indication information may be carried in the paging message. In addition, the paging message includes a UE ID, namely, a serving temporary mobile subscriber identity (S-TMSI), used to indicate a specific UE to be paged. Therefore, in this embodiment of this application, a preconfigured resource that needs to be released may be selectively released. To be specific, one or more preconfigured resources that need to be released are determined based on whether the first indication information is associated with the UE ID. A specific implementation may be as follows:

Manner 1: If the first indication information is not associated with the UE ID in the paging message, all UEs that receive the first indication information release preconfigured resources.

Manner 2: If the first indication information is associated with the UE ID in the paging message, UE that receives the first indication information determines whether a UE ID of the UE is the same as the UE ID in the paging message; and if the UE ID of the UE is the same as the UE ID in the paging message, releases the preconfigured resource.

Certainly, in this embodiment, in addition to being associated with the UE, the first indication information may also correspond to one or more sets of preconfigured resources of one UE. The eNB may indicate to release a specific set of preconfigured resources. For example, when the direct indication is used to indicate release, some or all bits in the reserved bits 6 to 8 may be used to correspondingly indicate release of one or more sets of preconfigured resources in the plurality of sets of preconfigured resources. For example, two bits are used to indicate release of at least two sets of preconfigured resources, and three bits may be used to indicate release of three sets of preconfigured resources. When the paging message is used to indicate the release, a quantity of bits is not limited. A preconfigured resource that needs to be released may be indicated arbitrarily.

B2: The eNB sends a wake-up signal (WUS) to the UE, where the WUS carries the first indication message. Specifically, a new signal sequence of the WUS may be used as the first indication information to indicate to release the preconfigured resource.

In this embodiment, the WUS is used to indicate whether the eNB sends a PDCCH scrambled by using a P-RNTI. If the WUS indicates to send the PDCCH, the UE detects the PDCCH scrambled by using the P-RNTI to detect a DCI format 6-2; or if the WUS indicates not to send the PDCCH, the UE does not perform detection, to reduce power consumption of the UE.

Step 903: The UE receives the first indication information sent by the eNB, and releases the preconfigured resource based on the first indication information.

In this embodiment, if the first indication information is carried in the wake-up signal, and the eNB uses the new signal sequence of the WUS as the first indication information, that the UE releases the preconfigured resource based on the first indication information includes:

After receiving the WUS, if the signal sequence of the WUS is the same as a preset signal sequence, and the WUS carries the first indication information, the UE releases the preconfigured resource.

In this embodiment of this application, when the eNB is overloaded, the eNB may directly indicate, by using the direct indication or the paging message, the UE to release the preconfigured resource, thereby quickly and effectively reducing the load of the eNB.

Figure 10:
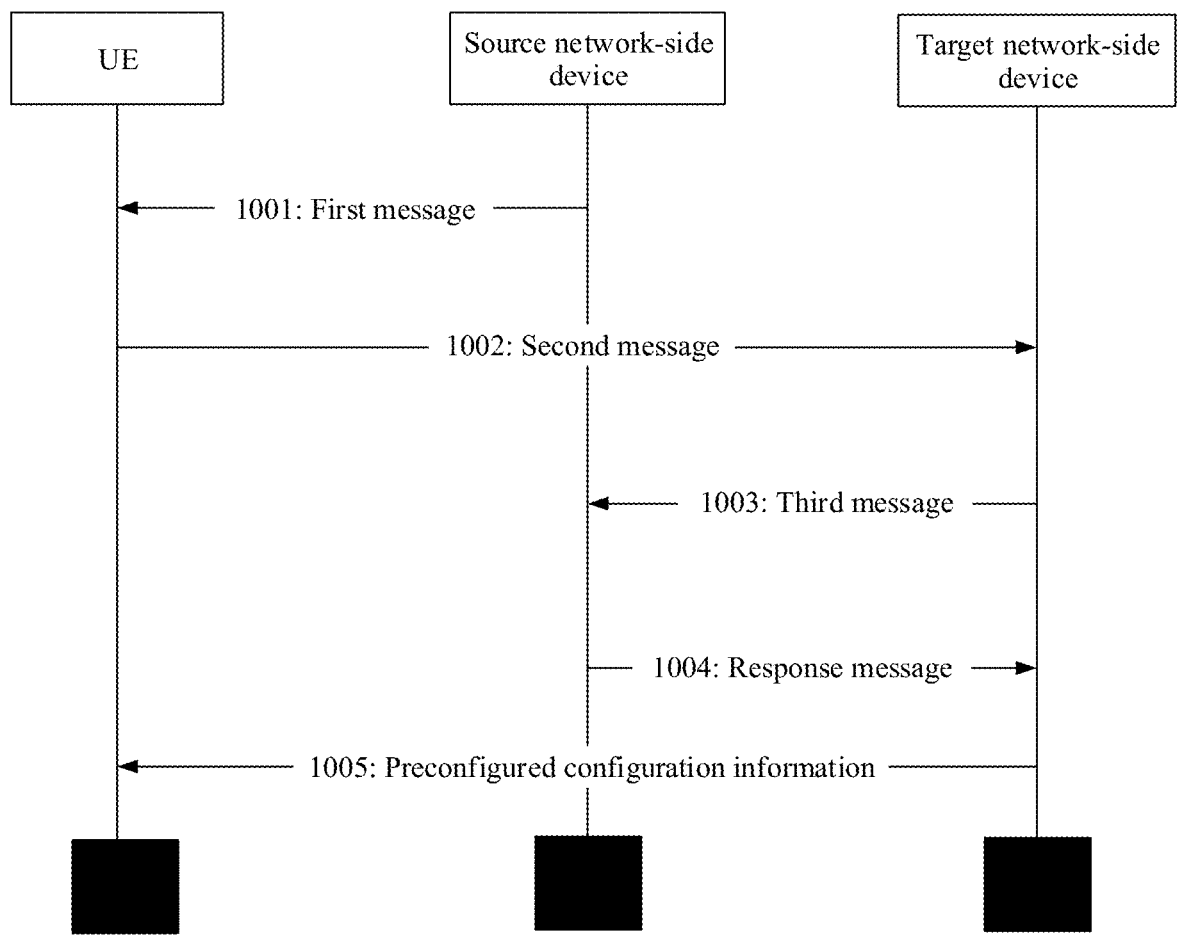
FIG. 10 is a schematic flowchart of another resource configuration method according to an embodiment of this application.

When a cell of UE changes, a preconfigured resource corresponding to the UE cannot be reused after the cell of the UE changes. If the preconfigured resource is not released, the resource is wasted. For this problem, this application further provides another resource configuration method, which specifically includes the following steps (as shown in FIG. 10).

Step 1001: A source network-side device (or referred to as a source cell) sends a first message to UE. The first message carries configuration information of a preconfigured resource.

Step 1002: When the UE determines that a serving cell changes, or when the UE performs cell reselection, the UE sends a second message to a target network-side device (or referred to as a target cell). The second message includes a first indication and an identifier. The first indication is used to indicate that a preconfigured resource is configured for the UE. The second message may be any one of the following messages:

an RRC connection request message;
an RRC connection resume request message;
RRC early data request message;
RRC connection setup complete message;
UE assistance information message; and
UE information response message.

The carried identifier is an identifier of the corresponding source cell or source network-side device before the serving cell of the UE changes or before the cell reselection, for example, a physical cell identity (PCI), a global cell identifier (E-UTRAN cell global identifier, ECGI), or an eNB ID.

Step 1003: After receiving the first indication and the identifier, the target network-side device sends a third message to the source network-side device. The third message may carry a second indication. The second indication is used to indicate the source network-side device to release the preconfigured resource corresponding to the UE. The second indication information may include one of the following:

used to indicate the terminal to access the target cell;
used to indicate the terminal to move to the target cell; or
used to indicate to release the preconfigured resource of the terminal.

In addition, the third message further includes an identifier of the terminal, for example, a cell RNTI (C-RNTI), an S-TMSI, or a resume ID.

Step 1004: The source network-side device sends a response message to the target cell. The response message carries an acknowledgment indication of the third message, to indicate that the source network-side device successfully receives the third message. Optionally, the response message further includes service mode information of the terminal. The service mode information includes an initiation periodicity, data amount information, and the like of a specific service of the terminal.

Step 1005: The target network-side device sends configuration information of a preconfigured resource to the terminal, and allocates the preconfigured resource to the terminal.

In this embodiment of this application, when moving to another cell and accesses the cell, the UE notifies the target cell that the preconfigured resource is configured for the UE, so that the target cell indicates the source cell to release the preconfigured resource. In this way, it is ensured that the preconfigured resource can be released in time after the UE performs a cell change.

Figure 11:
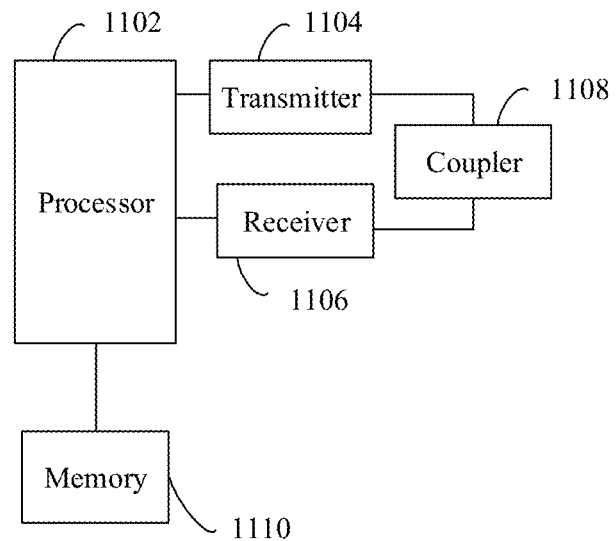
FIG. 11 is a schematic structural diagram of a terminal device according to an embodiment of this application.

As shown in FIG. 11, based on the methods provided in Embodiments 1 to 3, a terminal device provided in an embodiment of this application includes:

The terminal device 1100 may include: a processor 1102, a transceiver (which may be a complete module integrating a transmitter 1104 and a receiver 1106, or may be a transmitter 1104 and a receiver 1106 that separately implement a transmitting function and a receiving function independently), a coupler 1108, and a memory 1110. In some embodiments of this application, these components may be connected by using a bus or in another manner. In FIG. 11, an example in which the components are connected by using a bus is used.

The coupler 1108 is configured to: divide a signal into a plurality of signals and allocate the signals to a plurality of receivers 1106.

The transmitter 1104 is configured to transmit a communications signal generated by the processor 1102, and the receiver 1106 is configured to receive the communications signal. During specific implementation, there may be one or more transmitters 1104 or receivers 1106.

The memory 1110 is configured to store instructions. During specific implementation, the memory 1110 may be a read-only memory (ROM), and may be configured to store the instructions.

The processor 1102 is configured to manage a wireless channel. In this embodiment of this application, the processor 1102 is further configured to invoke the instructions stored in the memory 1110, to perform the following steps:

receiving a first message sent by a base station, where the first message carries configuration information of a preconfigured resource, and the preconfigured resource is used for data transmission by the UE in an idle state; and obtaining first indication information, and determining, based on the first indication information, to release the preconfigured resource.

The first indication information may be included in the configuration information.

According to the apparatus provided in embodiments of this application, the base station may control the UE, so that the UE can release the preconfigured resource when a specific condition is satisfied, thereby avoiding a waste of the preconfigured resource that is caused because the preconfigured resource is not used for a long period of time.

In this embodiment, the processor 1102 is further configured to: determine, based on the first indication information, whether the preconfigured resource is valid; and if the preconfigured resource is invalid, release the preconfigured resource.

When the first indication information indicates validity of the preconfigured resource, the first indication information may be used to indicate a validity period of the preconfigured resource or indicate a quantity of times that the preconfigured resource can be used. In this case, the corresponding processor 1102 may determine, in at least two manners, whether the preconfigured resource is valid. Details are as follows:

Manner 1: When the first indication information indicates the validity period of the preconfigured resource, the processor 1102 is specifically configured to: determine whether a moment corresponding to a current preconfigured resource is within a validity period; and if the moment is within the validity period, determine that the preconfigured resource is valid; or if the moment is not within the validity period, determine that the preconfigured resource is invalid, where a start moment of the validity period is a preset first moment, and duration of the validity period is a duration value corresponding to the validity period; or determine a time difference between a moment corresponding to a current preconfigured resource and a moment corresponding to a preconfigured resource previously used by the UE; determine whether the time difference is less than duration corresponding to information about the validity period; and if the time difference is less than the duration, determine that the preconfigured resource is valid; or if the time difference is not less than the duration, determine that the preconfigured resource is invalid.

Manner 2: When the first indication information indicates the validity period of the preconfigured resource, the processor 1102 is specifically configured to: start a timer at a preset second moment, where duration of the timer is a duration value corresponding to the validity period; and when determining whether the preconfigured resource is valid, determine that the preconfigured resource is valid if the timer is running, or determine that the preconfigured resource is invalid if the timer expires or stops running.

To prolong the validity period, the timer may further be adjusted based on the following mechanism, to prolong the validity period of the preconfigured resource. For example, when determining that the preconfigured resource is valid, the processor 1102 is further configured to reset the timer if the UE uses the preconfigured resource.

Manner 3: When the first indication information indicates the quantity of times that the preconfigured resource can be used, the processor 1102 is further configured to: after the preconfigured resource takes effect, start counting when the first preconfigured resource appears for the first time; determine whether a quantity of times that the preconfigured resource appears is within the quantity of times that the preconfigured resource can be used; and if the quantity of times that the preconfigured resource appears is within the quantity of times that the preconfigured resource can be used, determine that the preconfigured resource is valid; or if the quantity of times that the preconfigured resource appears is not within the quantity of times that the preconfigured resource can be used, determine that the preconfigured resource is invalid; or start counting when the UE uses the preconfigured resource; determine whether a quantity of times that the preconfigured resource appears is within the quantity of times that the preconfigured resource can be used; and if the quantity of times that the preconfigured resource appears is within the quantity of times that the preconfigured resource can be used, determine that the preconfigured resource is valid; or if the quantity of times that the preconfigured resource appears is not within the quantity of times that the preconfigured resource can be used, determine that the preconfigured resource is invalid.

In addition, when a network side is overloaded, if a preconfigured resource cannot be released in time, a problem such as network disconnection is caused. Therefore, when a base station is overloaded, the base station may directly send the first indication information, and indicate the UE to release the preconfigured resource, to resolve a waste of the preconfigured resource and the network disconnection.

The processor 1102 is further configured to: receive a PDCCH scrambled by using a P-RNTI; and if a paging message scheduled by the PDCCH carries the first indication information, or a direct indication carried by the PDCCH includes the first indication information, release the preconfigured resource, where the first indication information is used to indicate to release the preconfigured resource.

The processor 1102 is further configured to: receive a wake-up signal (WUS); and if a signal sequence of the WUS is the same as a preset signal sequence, and the WUS carries the first indication information, release the preconfigured resource.

Embodiment 6

Figure 12:
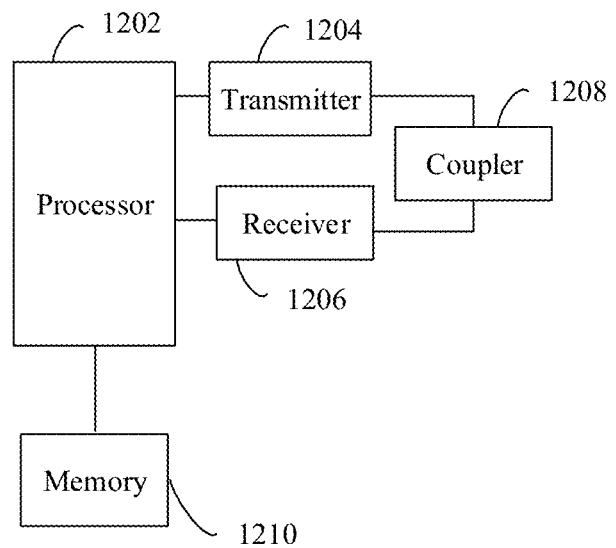
FIG. 12 is a schematic structural diagram of another terminal device according to an embodiment of this application.

As shown in FIG. 12, based on the method provided in Embodiment 4, a terminal device provided in this embodiment of this application includes:

The terminal device 1200 may include: a processor 1202, a transceiver (which may be a complete module integrating a transmitter 1204 and a receiver 1206, or may be a transmitter 1204 and a receiver 1206 that separately implement a transmitting function and a receiving function independently), a coupler 1208, and a memory 1210. In some embodiments of this application, these components may be connected by using a bus or in another manner. In FIG. 12, an example in which the components are connected by using a bus is used.

The coupler 1208 is configured to: divide a signal into a plurality of signals and allocate the signals to a plurality of receivers 1206.

The transmitter 1204 is configured to transmit a communications signal generated by the processor 1202, and the receiver 1206 is configured to receive the communications signal. During specific implementation, there may be one or more transmitters 1204 or receivers 1206.

The memory 1210 is configured to store instructions. During specific implementation, the memory 1210 may be a read-only memory (ROM), and may be configured to store the instructions.

The processor 1202 is configured to manage a wireless channel. In this embodiment of this application, the processor 1202 is further configured to invoke the instructions stored in the memory 1210, to perform the following steps:

receiving a first message from a source network-side device, where the first message carries configuration information of a preconfigured resource, and the preconfigured resource is used for data transmission by the UE in an idle state; and when determining that a serving cell changes or when the terminal device performs cell reselection, releasing the preconfigured resource.

Before the UE releases the preconfigured resource, the processor 1202 is further configured to send a second message to a corresponding target network-side device after a serving cell changes or after cell reselection, where the second message carries a first indication and an identifier, the first indication is used to indicate the preconfigured resource configured for the UE, and the identifier indicates an identifier of a corresponding source cell or of the source network-side device before the serving cell of the UE changes or before the cell reselection.

Embodiment 7

Figure 13:
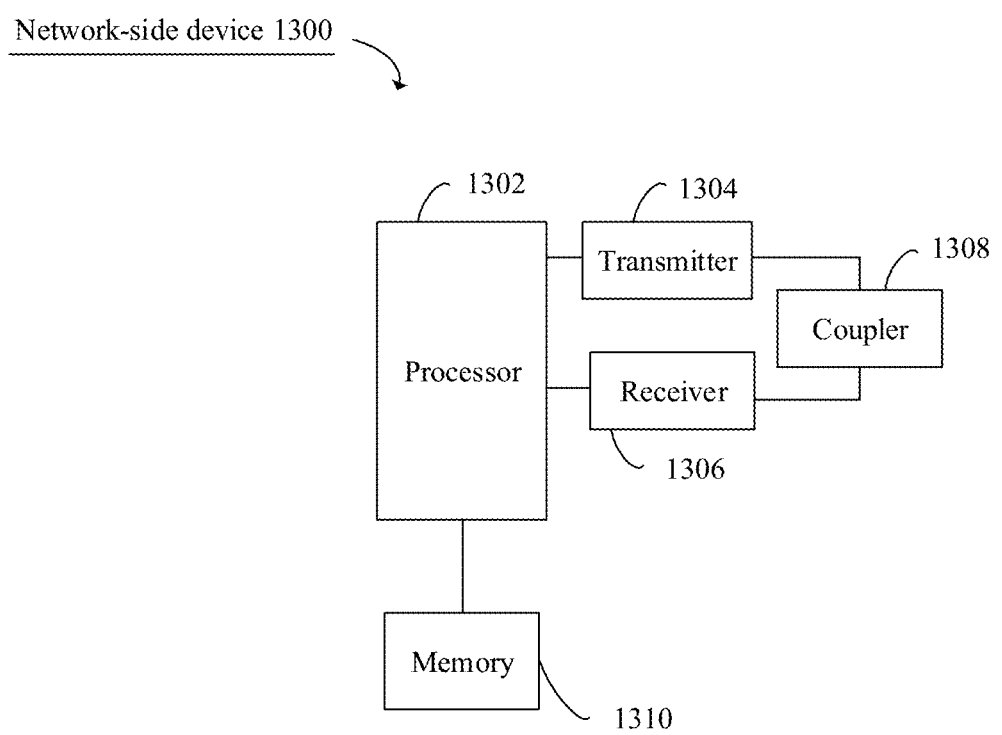
FIG. 13 is a schematic structural diagram of a network-side device according to an embodiment of this application.

As shown in FIG. 13, based on the method provided in Embodiment 4, a network-side device provided in this embodiment of this application includes:

The network-side device 1300 may include: a processor 1302, a transceiver (which may be a complete module integrating a transmitter 1304 and a receiver 1306, or may be a transmitter 1304 and a receiver 1306 that separately implement a transmitting function and a receiving function independently), a coupler 1308, and a memory 1310. In some embodiments of this application, these components may be connected by using a bus or in another manner. In FIG. 13, an example in which the components are connected by using a bus is used.

The coupler 1308 is configured to: divide a signal into a plurality of signals and allocate the signals to a plurality of receivers 1306.

The transmitter 1304 is configured to transmit a communications signal generated by the processor 1302, and the receiver 1306 is configured to receive the communications signal. During specific implementation, there may be one or more transmitters 1304 or receivers 1306.

The memory 1310 is configured to store instructions. During specific implementation, the memory 1310 may be a read-only memory (ROM), and may be configured to store the instructions.

The processor 1302 is configured to manage a wireless channel. In this embodiment of this application, the processor 1302 is further configured to invoke the instructions stored in the memory 1310, to perform the following steps:

sending first indication information to UE, where the first indication information is used to indicate the UE to release a preconfigured resource, and the preconfigured resource is used for data transmission by the UE in an idle state.

To allocate a preconfigured resource to the UE, in this embodiment, the processor 1302 is further configured to send the first message to the UE, where the first message carries the configuration information of the preconfigured resource.

The first indication information may be included in a first message. In addition, if the first indication information indicates that the preconfigured resource is invalid, the UE releases the preconfigured resource. Further, an implementation for determining whether the preconfigured resource is valid is further specifically indicated. To be specific, whether the preconfigured resource is still valid for the UE may be determined based on duration in which the preconfigured resource is occupied by the UE and a quantity of times that the preconfigured resource appears after the preconfigured resource is allocated to the UE. Corresponding to this case, the first indication information may be used to indicate a validity period of the preconfigured resource or indicate a quantity of times that the preconfigured resource can be used.

Optionally, the processor 1302 is further configured to send, to the UE, a PDCCH scrambled by using a P-RNTI, where the PDCCH or a paging message scheduled by the PDCCH carries the first indication information, or a direct indication carried by the PDCCH carries the first indication information.

Optionally, the processor 1302 is further configured to send a wake-up signal (WUS) to the UE, where the WUS carries the first indication message.

Embodiment 8

This embodiment of this application further provides a network-side device. When a cell of UE changes, the network-side device corresponds to a source cell of the UE after the cell changes. The network-side device includes:
- a processor; and
- a memory, storing instructions, and connected to the processor, where when the instructions are loaded and executed by the processor, the following steps are performed:
- sending a first message to user equipment UE, where the first message carries configuration information of a preconfigured resource; and
- receiving a second message from a target network-side device, where the second message carries a first indication and an identifier, the first indication is used to indicate that the preconfigured resource is preconfigured for the UE, and the identifier is an identifier of the UE.

Based on the foregoing methods, an embodiment of this application further provides a computer storage medium. The computer storage medium includes a computer program. When the computer program is run on a computer, the computer is enabled to perform a method according to any one of Embodiment 1 to Embodiment 4.

Based on the foregoing methods, an embodiment of this application further provides a computer program product including instructions. When the instructions are run on a computer, the computer is enabled to perform the method according to any one of Embodiment 1 to Embodiment 4.

The methods of this application are not limited to the embodiments described in the exemplary implementations. Other implementations obtained by a person skilled in the art according to technical solutions of this application also fall within the technical innovation scope of this application.

It will be appreciated that a person skilled in the art can make various modifications and variations to this application without departing from the scope of this application. This application is intended to cover these modifications and variations of this application, provided that they fall within the scope of protection defined by the following claims and their equivalent technologies in this application.

What is claimed is:

1. A resource configuration method, comprising:
receiving, by a user equipment (UE), a first message from a base station, wherein the first message carries configuration information of a preconfigured resource used for data transmission by the UE in an idle state;
obtaining, by the UE, first indication information, wherein the first indication information indicates a quantity of times that the preconfigured resource can be used;
determining, by the UE, based on the first indication information, whether the preconfigured resource is valid, wherein determining whether the preconfigured resource is valid comprises:
based on the UE using the preconfigured resource, starting to count a number of times that the preconfigured resource appears, and
based on the number of times that the preconfigured resource appears not being within the quantity of times indicated by the first indication information, determining that the preconfigured resource is invalid; and
based on determining that the preconfigured resource is invalid, releasing the preconfigured resource.

2. The method according to claim 1, wherein the first indication information is comprised in the configuration information.

3. The method according to claim 1, wherein obtaining the first indication information comprises: receiving, by the UE, a wake-up signal (WUS) carrying the first indication information; and
wherein releasing the preconfigured resource is further based on a signal sequence of the WUS being the same as a preset signal sequence.

4. A terminal device, comprising:
a processor; and
a non-transitory computer-readable storage medium storing instructions for execution by the processor, wherein the instructions, when executed by the processor, facilitate performance of the following by the terminal device:
receiving a first message from a base station, wherein the first message carries configuration information of a preconfigured resource used for data transmission by the terminal device in an idle state;
obtaining first indication information, wherein the first indication information indicates a quantity of times that the preconfigured resource can be used;
determining, based on the first indication information, whether the preconfigured resource is valid, wherein determining whether the preconfigured resource is valid comprises:
based on the terminal device using the preconfigured resource, starting to count a number of times that the preconfigured resource appears, and
based on the number of times that the preconfigured resource appears not being within the quantity of times indicated by the first indication information, determining that the preconfigured resource is invalid; and
based on determining that the preconfigured resource is invalid, releasing the preconfigured resource.

5. The terminal device according to claim 4, wherein the first indication information is comprised in the configuration information.

6. The terminal device according to claim 4, wherein obtaining the first indication information comprises: receiving a wake-up signal (WUS) carrying the first indication information; and
wherein releasing the preconfigured resource is further based on a signal sequence of the WUS being the same as a preset signal sequence.

7. A non-transitory computer-readable medium having processor-executable instructions for resource configuration, wherein the processor-executable instructions, when executed, facilitate performance of the following:
receiving a first message from a base station, wherein the first message carries configuration information of a preconfigured resource used for data transmission by a user equipment (UE) in an idle state;
obtaining first indication information, wherein the first indication information indicates a quantity of times that the preconfigured resource can be used;
determining, based on the first indication information, whether the preconfigured resource is valid, wherein determining whether the preconfigured resource is valid comprises:
based on the UE using the preconfigured resource, starting to count a number of times that the preconfigured resource appears, and based on the number of times that the preconfigured resource appears not being within the quantity of times indicated by the first indication information, determining that the preconfigured resource is invalid; and based on determining that the preconfigured resource is invalid, releasing the preconfigured resource.

8. The non-transitory computer-readable medium according to claim 7, wherein the first indication information is comprised in the configuration information.

9. The non-transitory computer-readable medium according to claim 7, wherein obtaining the first indication information comprises: receiving, by the UE, a wake-up signal (WUS) carrying the first indication information; and wherein releasing the preconfigured resource is further based on a signal sequence of the WUS being the same as a preset signal sequence.

10. A system for resource configuration, comprising:

a user equipment (UE); and a base station configured to send a first message to the UE, wherein the first message carries configuration information of a preconfigured resource used for data transmission by the UE in an idle state;

wherein the UE is configured to:

obtain first indication information, wherein the first indication information indicates a quantity of times that the preconfigured resource can be used;

determine, based on the first indication information, whether the preconfigured resource is valid, wherein determining whether the preconfigured resource is valid comprises: based on the UE using the preconfigured resource, starting to count a number of times that the preconfigured resource appears, and based on the number of times that the preconfigured resource appears not being within the quantity of times indicated by the first indication information, determining that the preconfigured resource is invalid; and based on determining that the preconfigured resource is invalid, release the preconfigured resource.

11. The system according to claim 10, wherein the first indication information is comprised in the configuration information.

12. The system according to claim 10, wherein obtaining the first indication information comprises: receiving a wake-up signal (WUS) carrying the first indication information; and wherein releasing the preconfigured resource is further based on a signal sequence of the WUS being the same as a preset signal sequence.

* * * * *